United States Patent [19]

Okado

[11] 4,309,751

[45] Jan. 5, 1982

[54] METHOD AND APPARATUS FOR CONTROLLING CURRENT TYPE INVERTERS

[75] Inventor: Chihiro Okado, Fuchu, Japan

[73] Assignee: Tokyo Shibaura Denki Kabushiki Kaisha, Kawasaki, Japan

[21] Appl. No.: 106,844

[22] Filed: Dec. 26, 1979

[30] Foreign Application Priority Data

Dec. 25, 1978 [JP] Japan .............................. 53-158506
Feb. 2, 1979 [JP] Japan .............................. 54-11073

[51] Int. Cl.³ .......................................... H02M 7/515
[52] U.S. Cl. ................................................. 363/138
[58] Field of Search ....................... 363/71, 136–138

[56] References Cited

U.S. PATENT DOCUMENTS

| | | | |
|---|---|---|---|
| 3,612,973 | 10/1971 | Kuniyoshi | 363/137 X |
| 3,707,668 | 12/1972 | Johnston | 363/137 |
| 4,039,926 | 8/1977 | Steigerwald | 363/138 |
| 4,183,081 | 1/1980 | Cutler et al. | 363/138 X |

FOREIGN PATENT DOCUMENTS 2055176 5/1972 Fed. Rep. of Germany ...... 363/138
53-32330 3/1978 Japan .

*Primary Examiner*—A. D. Pellinen

*Attorney, Agent, or Firm*—Stevens, Davis, Miller & Mosher

[57] ABSTRACT

In an inverter device comprising an inverter bridge connected across a DC source, an auxiliary thyristor bridge connected to AC terminals of the inverter bridge, a condenser connected across cathode and anode electrodes of the auxiliary thyristor bridge which acts as a first switching circuit for charging and discharging the condenser and a second switching circuit including choppers for connecting anode and cathode electrodes of the auxiliary thyristor bridge across the DC source, there is provided a control method which comprises the steps of comparing voltage of the condenser with a reference voltage, controlling respective switching circuits so as to effect commutation of the inverter bridge in a direction to charge the condenser when the voltage thereof is lower than the respective voltage, controlling respective switching circuits so as to effect commutation of the inverter bridge in a direction to discharge the condenser when the voltage thereof is higher than the reference voltage thereby controlling the condenser voltage in accordance with the reference voltage. According to a modification the conduction times of the second switching circuit and the auxiliary thyristor bridge are varied in accordance with the condenser voltage.

4 Claims, 18 Drawing Figures

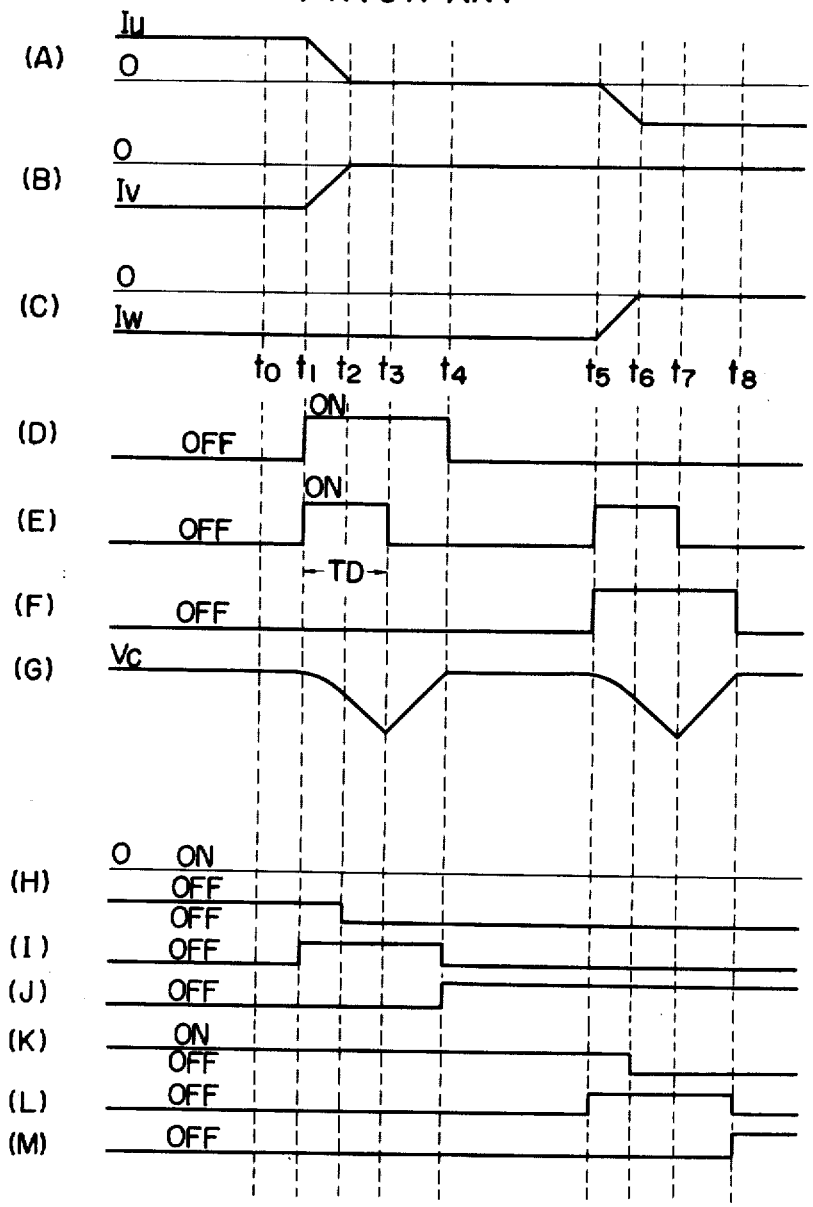

F I G. 5
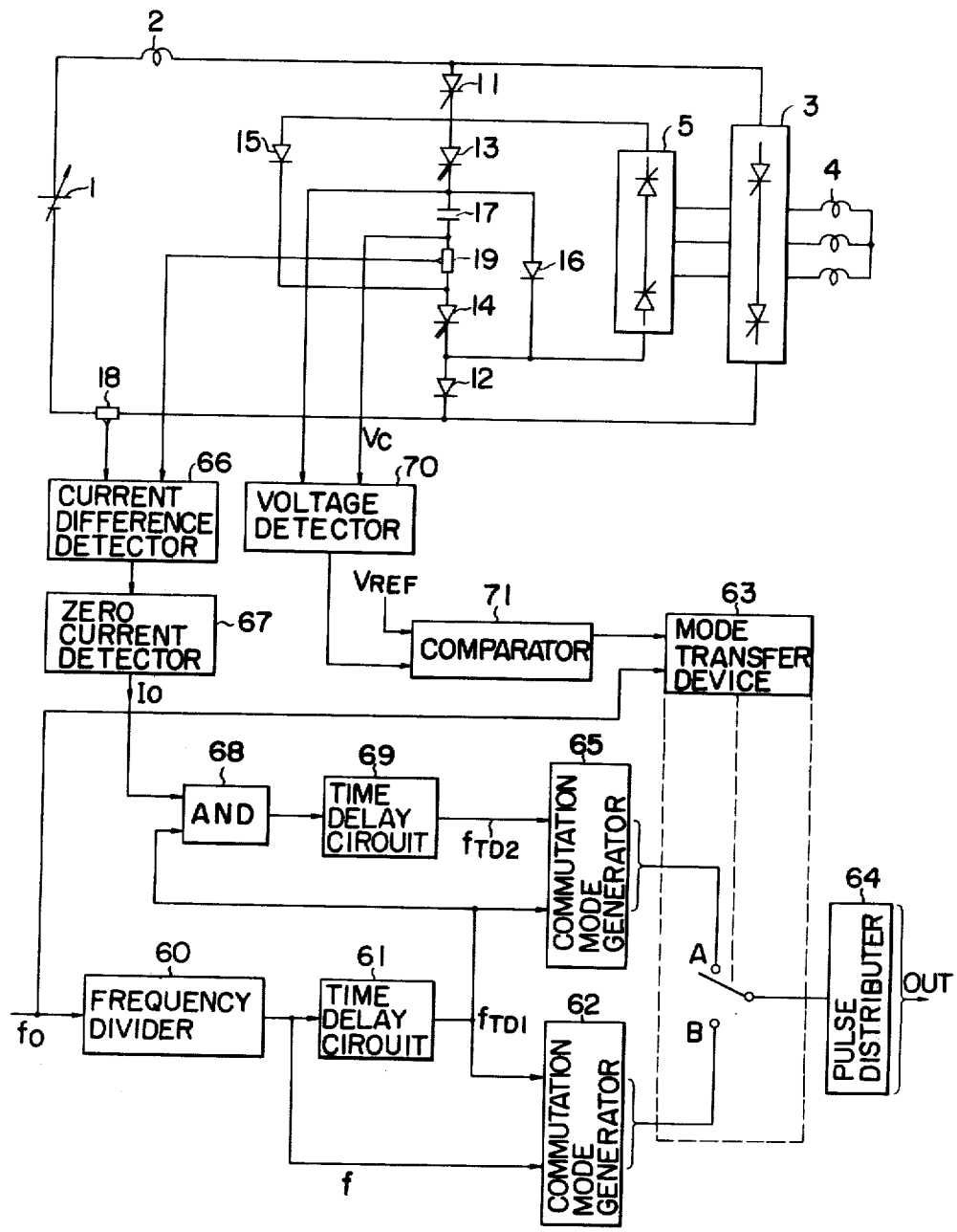

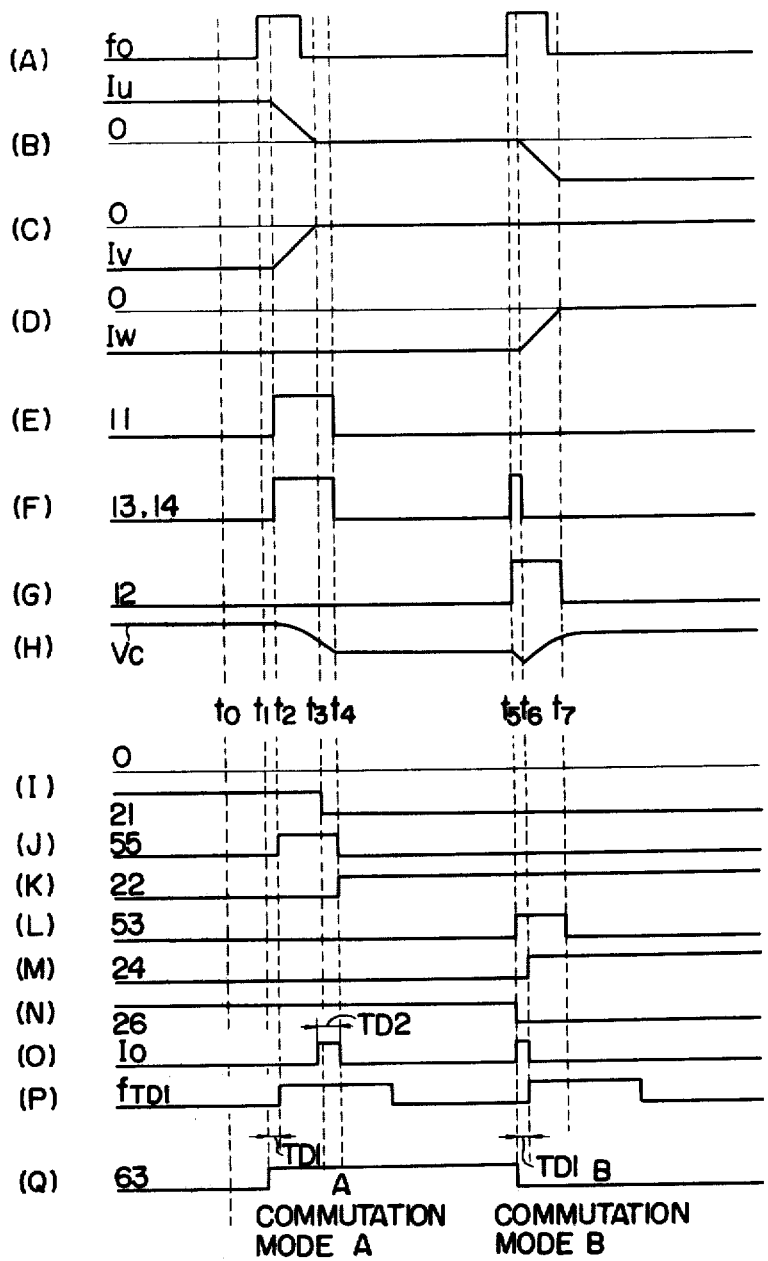

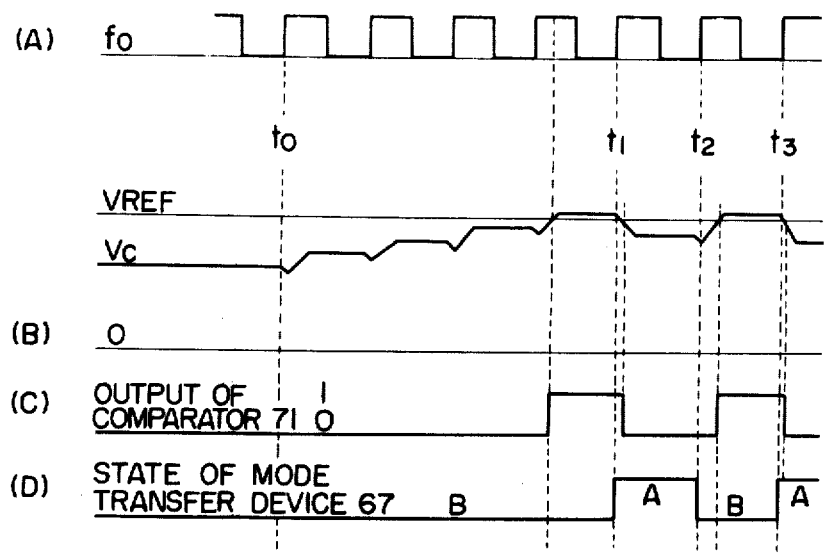
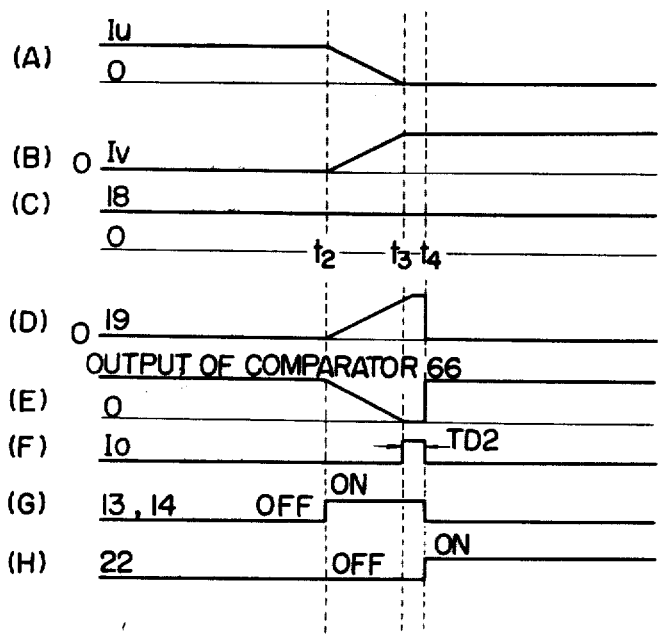

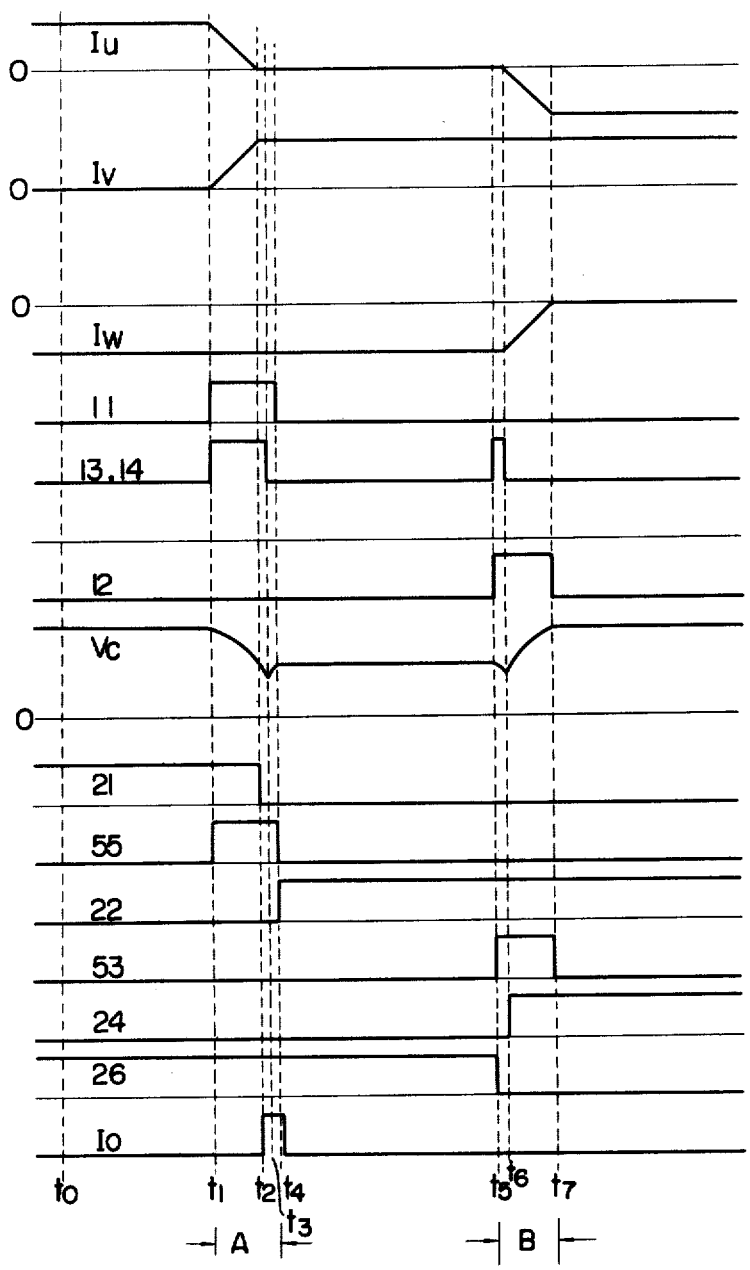

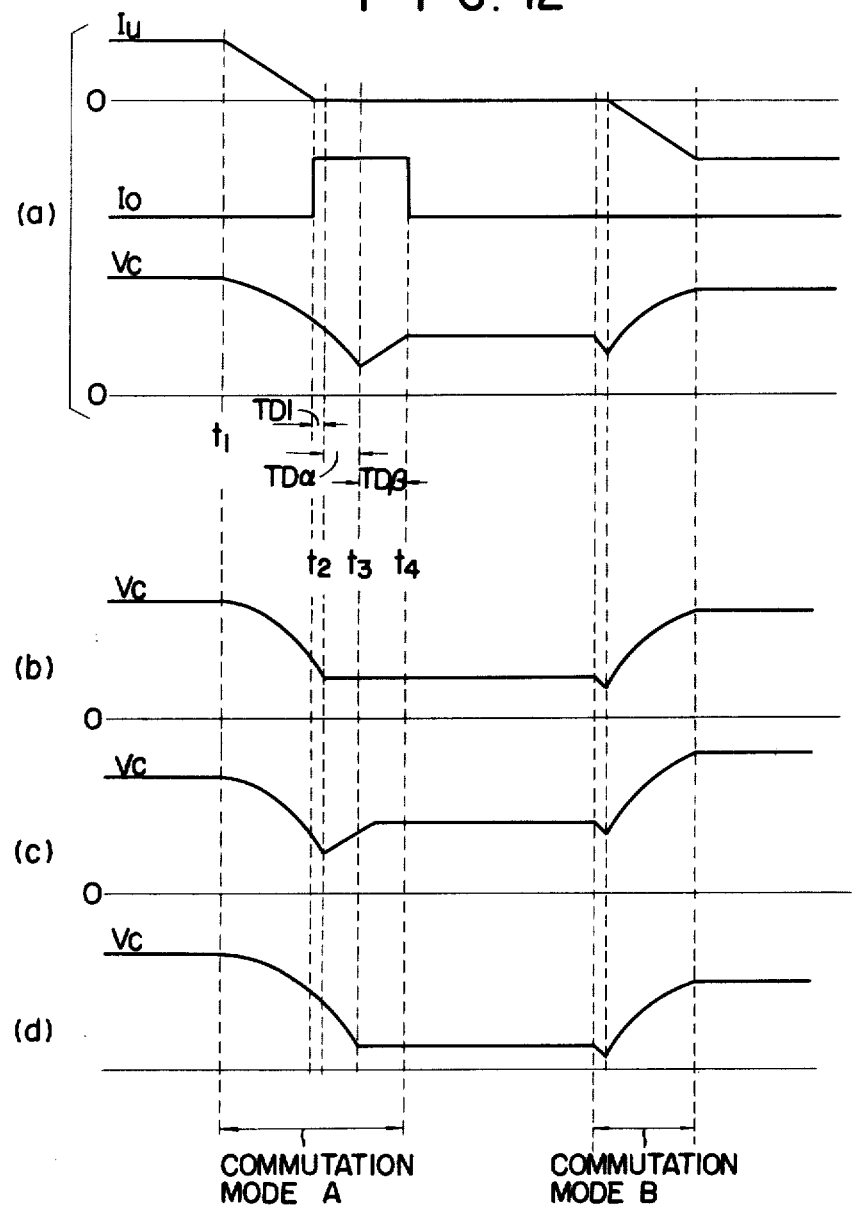

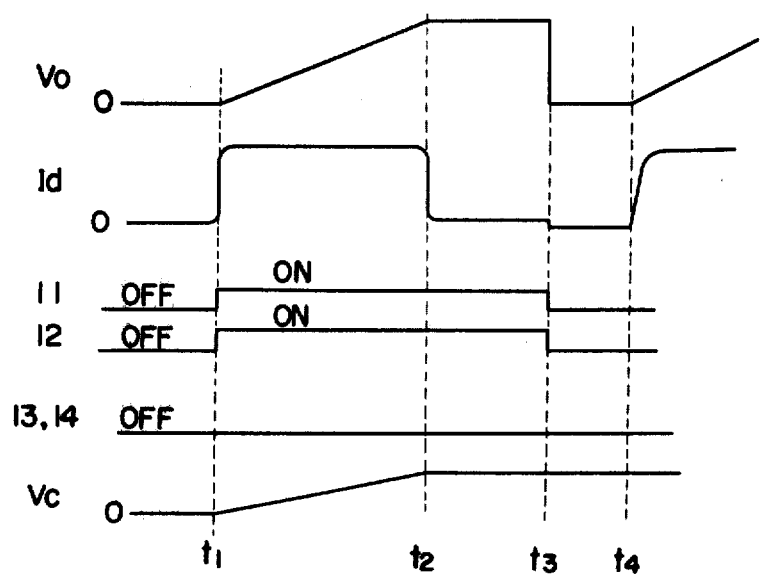

METHOD AND APPARATUS FOR CONTROLLING CURRENT TYPE INVERTERS

BACKGROUND OF THE INVENTION

This invention relates to a method and apparatus for controlling a current type inverter, more particularly a current type inverter provided with a forced commutating circuit and utilized to drive an AC motor or the like load.

FIG. 1 shows a so-called series diode type inverter of the well known type. The inverter circuit comprises a DC source 1, a series reactor 2, main thyristors 21–26, diodes 31–36, and commutating condensers 41–46. The inverter bridge circuit comprises three parallel connected branch circuits each including two main thyristors and two diodes which are connected in series as shown and the commutating capacitors are connected between adjacent branch circuit. A load, shown as a three phase motor 4 is connected to the junctions of a pair of diodes in each branch circuit. There are also provided a diode bridge 6, a condenser 7, and a resistor 8, the AC terminals of the diode bridge 6 being connected in parallel with the motor 4.

The DC current from the DC source 1 is converted into a three phase AC by the operation of the inverter bridge and supplied to phases U, V and W of the motor 4. The operation of the inverter bridge at the time of commutation is as follows: Let us consider an interval in which current is flowing through main thyristor 21, diode 31, phases U and W of the load 4, diode 36 and main thyristor 26, and in which the current is to be communicated from phase U to phase V.

Before commutation, the condenser 41 is charged to have a polarity as shown in FIG. 1. When thyristor 22 is ignited under these conditions, the main thyristor 21 will be turned off by the voltage across the commutating condenser 41 so that the current from DC reactor 2 flows to phase U through main thyristor 22, condenser 41 and diode 31 thereby charging the condenser to a polarity opposite to that shown in FIG. 1. When the terminal voltage of the condenser 41 exceeds the voltage between U and V phases, diode 32 begins to conduct whereby the condenser 41 constitutes an oscillation circuit together with the inductance of the motor 4 thereby decreasing the U phase current while increasing the V phase current. When these currents become equal to the direct current $I_{DC}$, the U phase current becomes zero, thus completing commutation to phase V.

With this construction, however, the energy stored in the inductance of motor 4 has a tendency to overcharge the commutating condenser 41 so that its terminal voltage becomes excessive. To prevent this, the diode bridge 6 is connected to the load terminals and the capacity of the condenser 7 is made large so as to absorb the excessive voltage of the condenser 41, the charge of the condenser 7 being discharged through resistor 8, or regenerated back to the source 1 by another inverter, not shown.

However, absorption of a portion of the commutating energy by the condenser 7 and discharge of its charge through a resistor means loss of energy, and even where the charge in the condenser 7 is regenerated by an independent inverter, the cost of the inverter circuit increases.

Accordingly it has been proposed an improved current type inverter in which a portion of the commutation energy is stored in a condenser and the charge therein is utilized again for commutation.

FIG. 2 shows such current type inverter, which, in addition to the main inverter bridge 3, comprises an auxiliary thyristor bridge circuit 5 acting as a switching circuit and including first auxiliary thyristors 51–56, a second auxiliary thyristors 11 and 12, thyristors 13 and 14 acting as choppers, a condenser 17 connected between these thyristors 13 and 14 and diodes 15 and 16 connected as shown.

With the circuit shown in FIG. 2, DC current from the source 1 is converted into three phase alternating current by the main inverter bridge circuit 3 and applied to the load motor 4. The AC terminals of the main inverter bridge circuit 3 is connected to corresponding AC terminals of the auxiliary thyristor bridge circuit 5, whereas the second auxiliary thyristors 11 and 12 are arranged to interconnect DC terminals of the main inverter bridge circuit 3 and the auxiliary thyristor bridge circuit 5.

A series circuit comprising the choppers 13 and 14 and the capacitor 17 (or an auxiliary DC source) is connected across the DC terminals of the auxiliary thyristor bridge circuit 5. The purpose of the diodes 15 and 16 is to connect, with a reverse polarity, the condenser 17 across the DC terminals of the auxiliary thyristor bridge 5 when the chopper 14 is turned off.

In many cases the DC source 1 is constituted by a phase controllable three phase thyristor rectifier and the choppers 13 and 14 are constituted by gate turn off thyristors (GTO), thyristor choppers provided with commutating devices or transistors.

A prior art method of controlling the inverter device shown in FIG. 2 will now be described with reference to the waveforms shown in FIG. 3 and diagrams shown in FIGS. 4a–4c. Curve A shown in FIG. 3 shows U phase current $I_u$ of the motor 4, curves B and C the V phase and W phase currents respectively, curve D the ON and OFF states of the second auxiliary thyristor 11, curve E the ON and OFF states of the choppers 13 and 14, curve F the ON and OFF states of the second auxiliary thyristors 12, curve G the voltage $V_c$ of condenser 17, curve H the ON.OFF state of the main thyristor, curve I the ON.OFF state of the first auxiliary thyristor, curve J the ON.OFF state of the main thyristor, curve K the ON.OFF state of the main thyristor, curve L the ON.OFF state of the auxiliary thyristor 53, and curve M the ON.OFF state of the main thyristor.

FIGS. 4a, 4b and 4c show current flow states under various control conditions. At time $t_0$, the main thyristors 21 and 26 are ON and the current flows through motor 4 in a direction shown by an arrow in FIG 4a. Under these conditions, when the second auxiliary thyristor 11 and choppers 13 and 14, and the first auxiliary thyristor 55 are turned ON at time $t_1$, a state as shown in FIG. 4b is established so that condenser 17 discharges to decrease $V_c$. At time $t_2$, the U phase current $I_u$ becomes zero whereas the V phase current $I_v$ becomes equal to the direct current $I_d$. During an interval between $t_2$ and $t_3$ the voltage of condenser 17 is applied in the reverse direction across the main thyristor 21 so that this thyristor is turned OFF. Then at time $t_3$ choppers 13 and 14 are turned OFF, the condenser 17 is charged by the V phase current $I_v$ to increase its voltage $V_c$. At time $t_4$ the main thyristor 22 is turned ON. Then the divided voltage of condenser 17 is applied across the second and first thyristors 11 and 55 in the reverse direction so as to turn OFF them. This state is shown in FIG. 4c.

The interval TD between $t_1$ and $t_3$ during which choppers 13 and 14 are ON should be made sufficiently longer than the commutation interval between $A_1$ and $A_4$ by taking into consideration variation in the load current as well as the variation in the backelectromotive force of the load. Because if the commutation completion time $t_2$ becomes later than time $t_3$ commutation failure would be resulted.

The timing of commutation from the first auxiliary thyristor 55 to the main thyristor 22 is controlled by detecting the fact that the voltage of condenser 17 has returned to the original value by which time $t_4$ is determined. This is done for the purpose of supplementing the loss of the charge of condenser 17 at the time of commutation during the interval $t_3$ and $t_4$. Since at time $t_4$ the condenser voltage $V_c$ has restored the value of $t_1$, such supplement assures the next commutation. In the same manner, during an interval between $t_5$ and $t_8$ current is commutated from main thyristor 26 to main thyristor 24.

As can be readily understood from FIG. 3, the interval between $t_2$ and $t_3$ is relatively longer than the commutation interval $t_1$ to $t_2$ and moreover it takes a relatively long time to recover the condenser voltage $V_c$ so that in order to operate with a commercial frequency it is necessary to select the capacitor voltage to be about twice of the load or motor voltage. This requires to make high the withstand voltage of the main circuit elements, which is uneconomical. More particularly, as the commutation interval $t_1$–$t_2$ is proportional to the load current and the load inductance and inversely proportional to the difference between the condenser voltage $V_c$ and the back electromotive force of the load so that it is necessary to increase the condenser voltage $V_c$. Increase in the condenser voltage causes increase of the rate of change in the load current at the time of commutation thus not only increasing noise of the motor but also increasing the commutation surge voltage at the load terminals. This requires increase in the breakdown voltage of the motor winding. Accordingly, it has been desired to provide an improved method of controlling an inverter device capable of increasing the operating frequency thereof by decreasing the time of completing the commutation sequence without increasing the condenser voltage.

SUMMARY OF THE INVENTION

Accordingly, it is an object of this invention to provide an improved method and apparatus for controlling an inverter apparatus capable of improving the limit of the operating frequency.

Another object of this invention is to provide an improved method and apparatus for controlling an inverter device capable of increasing the operating frequency of the inverter by decreasing the time of completing the commutation sequence without increasing the breakdown voltage of the main circuit elements.

According to one aspect of this invention there is provided a method of controlling an inverter bridge connected across a direct current source, an auxiliary thyristor bridge connected to AC output terminals of the inverter bridge, a condenser connected across cathode and anode electrodes of the auxiliary thyristor bridge which acts as a first switching circuit for charging and discharging the condenser, and a second switching circuit for connecting cathode and anode electrodes of the auxiliary thyristor bridge across the DC source, characterized in that the method comprises the steps of comparing voltage of the condenser with a reference voltage, controlling the respective switching circuits so as to effect commutation of the inverter bridge in a direction to charge the condenser when the condenser voltage is lower than the reference voltage, controlling respective switching circuits so as to effect commutation of the inverter bridge in a direction to discharge the condenser when the condenser voltage is higher than the reference voltage.

According to a modified method the conduction times of the second switching circuit and the auxiliary thyristors are varied in accordance with the condenser voltage.

According to another aspect there is provided a control apparatus for an inverter device comprising an inverter bridge connected across a direct current source, an auxiliary thyristor bridge connected to AC output terminals of the inverter bridge, a condenser connected across cathode and anode electrodes of the auxiliary thyristor bridge which acts as a first switching circuit for charging and discharging the condenser, and a second switching circuit for connecting cathode and anode electrodes of the auxiliary thyristor bridge across the DC source, characterized in that the control apparatus comprises means responsive to difference between direct currents flowing through the inverter device and through the condenser for producing a commutation completion signal, a comparator for comparing voltage of the condenser with a predetermined reference value, a frequency divider for dividing commutating frequency into an output frequency of the inverter device, first time delay means for delaying the output of the frequency divider by a predetermined time, second time delay means connected to respond to the commutation completion signal and the output of the first time delay means via an AND gate circuit, a first commutation mode generator connected to receive the outputs of the first and second time delay means for producing a second mode in which the commutation of the inverter circuit is to be made such that the condenser is charged when the condenser voltage is higher than the reference voltage, a second commutation mode generator connected to receive the outputs of the frequency divider and the first time delay means for producing a first mode in which the commutation of the inverter device is to be made such that the condenser discharges when the condenser voltage is higher than the reference voltage, a pulse distributor for distributing ignition pulses to the inverter bridge, the auxiliary thyristor bridge and the second switching circuit and the choppers, and mode transfer means responsive to the output of the comparator and the inverter commutation frequency for connecting either one of the outputs of the first and second mode generators to the pulse distributor.

BRIEF DESCRIPTION OF THE DRAWINGS

In the accompanying drawings:

FIGS. 3A–3M show waveforms at various portions adapted to explain a prior art method of controlling an inverter device;

FIG. 5 is a block diagram showing the method and apparatus for controlling an inverter device embodying the invention;

FIGS. 6A-6Q are waveforms useful to explain the operation of the inverter device shown in FIG. 5;

FIGS. 8A-8D are waveforms for explaining the operation of the inverter device shown in FIG. 5;

FIGS. 9A-9H are enlarged waveforms of the waveforms shown in FIG. 6 during the second commutation mode;

FIGS. 11, 12 and 13 are waveforms useful to explain the operation of the embodiment shown in FIG. 10.

DESCRIPTION OF THE PREFERRED EMBODIMENTS

Figure 1:
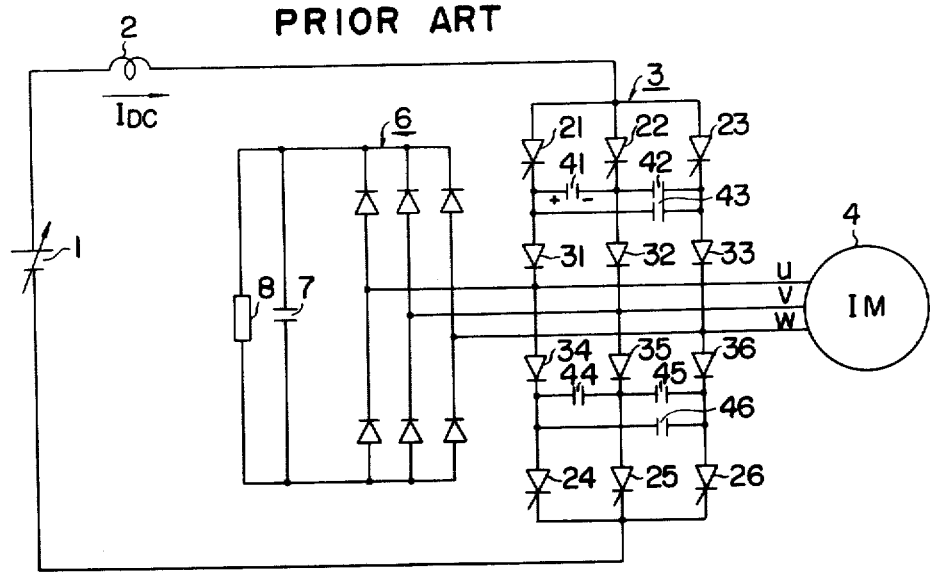
FIG. 1 is a connection diagram showing a basic circuit construction of a prior art series diode type inverter device.
Figure 2:
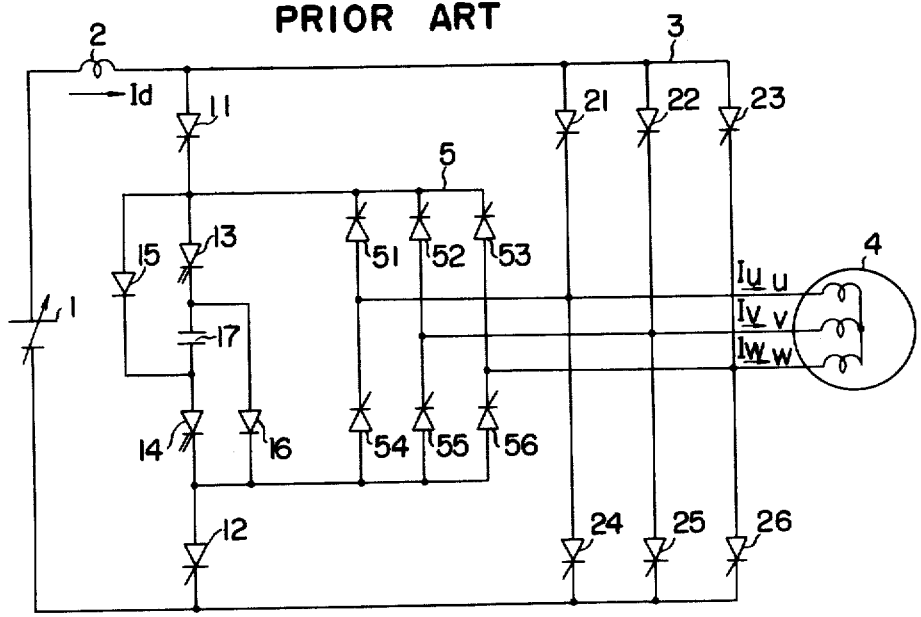
FIG. 2 is a connection diagram showing a basic connection diagram of a prior art current type inverter device.

The control device of an inverter device embodying the invention comprises current detectors 18 and 19, a frequency divider 60, time delay circuits 61 and 69, commutation mode generator 62 and 65, a current difference detector 66, a mode transfer device 63, a pulse distributor 64, an AND gate circuit 68, a voltage detector 70, a comparator 71, and a zero current detector 67.

The operation of the control device will now be described with reference to FIGS. 6A-6Q and FIGS. 7a-7d. Curve A in FIG. 6 shows a signal of an inverter commutation frequency $f_o$, curve B the U phase current $I_u$ of the motor 4, curve C the V phase current $I_v$ of the motor, curve D the W phase current $I_w$, curve E the ON-OFF state of the second auxiliary thyristor 11, curve F the ON-OFF state of the choppers 13 and 14, curve G the ON-OFF state of the second auxiliary thyrister 12, curve H the voltage $V_c$ of condenser 17, curve I the ON-OFF state of the main thyristor 21, curve J the ON-OFF state of the first auxiliary thyristor 55, curve K the ON-OFF state of the main thyristor 22, curve L the ON-OFF state of the first auxiliary thyristor 53, curve M the ON-OFF state of the main thyristor 24, curve N the ON-OFF state of the main thyristor 26, curve O the output $I_o$ of the zero current detector, current P the output $f_{TD1}$ of the time delay circuit, and curve Q the output of the mode transfer device 63. FIGS. 7a-7d show partial circuit diagrams under various conditions.

The frequency divider 60 divides a signal corresponding to the inverter commutation frequency into 6 phases to produce an output corresponding to the inverter frequency f. The output is delayed by time delay circuit 61 to produce an output $f_{TD1}$. The outputs of the frequency divider 60 and the time delay circuit 61 by $TD_1$ are applied to the first commutation mode generator 62 which controls the first commutation mode. The output of the first commutation mode generator 62 is applied to the pulse distributor 64 via mode transfer device 63 and converted into a control signal OUT which controls the inverter bridge 3, the auxiliary thyristor bridge 5, the second auxiliary thyristors 11 and 12, and choppers 13 and 14.

The output $f_{TD1}$ of the time delay circuit 61 is applied to one input of a second commutation mode generator 65 which controls the second commutation mode A and also to one input of the AND gate circuit 68. The difference between the direct current signal detected by the current detector 18 and the condenser current is detected by the current difference detector 66 and its output is applied to the zero current detector 67 which checks the commutation completion when the output of the current difference detector 66 becomes zero, and the output of the zero current detector 67 is applied to the other input of AND gate circuit 68. In response to the commutation completion check signal $I_o$, the AND gate circuit 68 is enabled to apply the output of the time delay circuit 61 to the time delay circuit 69 a signal $f_{TD1}$, which is delayed than the out of the output of time delay circuit 61 by $TD_2$ to the other input of the second commutation mode generator 65. The output of the second commutation mode generator 65 is applied to the pulse distributor 64 via mode transfer device 63 to produce a control signal OUT to inverter bridge 3, auxiliary thyristor bridge 5, the second auxiliary thyristors 11 and 12 and choppers 13 and 14. The voltage detector 70 detects the voltage $V_c$ of capacitor 17 and the detected voltage is compared with a reference value $V_{REF}$ by comparator 71. Where the condenser voltage $V_c$ is higher than the reference value $V_{REF}$, the mode transfer device 63 applies the output of the second commutation mode generator 65 to the pulse distributor 64 in synchronism with the inverter commutating frequency $f_o$ whereas when the condenser voltage is lower than the reference value the mode transfer device applies the output of the first commutation mode generator 62 to the pulse distributor 64 in synchronism with the inverter commutation frequency $f_o$.

The operation described above will be described in more detail with reference to FIG. 6, FIGS. 7a-7d and FIGS. 4a, 4b and 4c. For the convenience of comparison with the control method shown in FIG. 3, in FIG. 6 the main thyristor 21 is shown in ON state at time $t_0$.

Figure 4A:
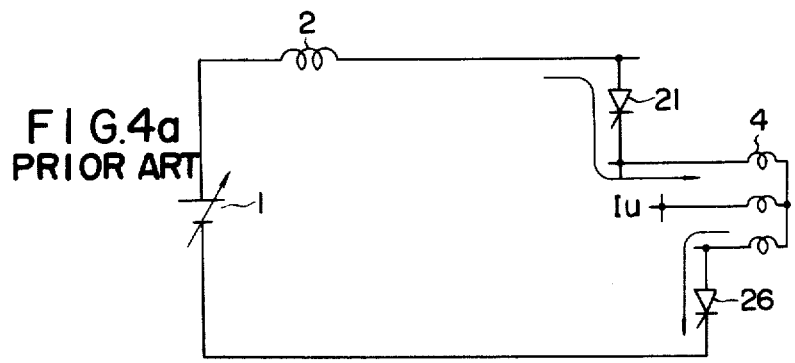
FIGS. 4a, 4b and 4c are partial connection diagrams for explaining the operation of a prior art inverter device.
Figure 4B:
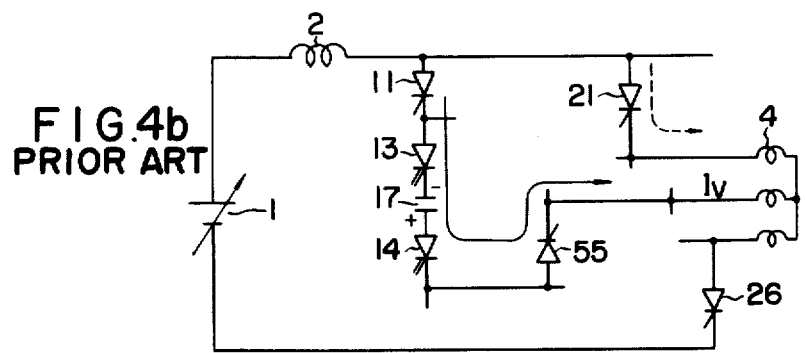

At time $t_2$ the second auxiliary thyristor 11 is turned ON together with choppers 13 and 14 and the first auxiliary thyristor 55 and the current path changes from FIG. 4a to FIG. 4b whereby the condenser 17 discharges to decrease its voltage $V_c$. Consequently, at time $t_3$ the current of the main thyristor 21 becomes zero thus completing the commutation of the load current from $I_u$ to $I_v$. The zero current detector 67 detects zero current in response to the output of the current difference detector 66 which is supplied with the outputs of the current detectors 18 and 19. When the output $I_o$ of the zero current detector 67 is "1" that is when the commutation completion is detected choppers 13 and 14 are turned OFF while the main thyristor 22 is turned ON at time $t_4$ after an interval $TD_2$ that is when the main thyristor 21 is turned OFF. This state corresponds to that shown in FIG. 4c. At this time, since the condenser voltage $V_c$ is applied in the reverse direction across the second and the first auxiliary thyristors 11 and 55 these auxiliary thyristors are quickly turned OFF to complete a commutation sequence.

The commutation mode in which the voltage of the condenser decreases as above described is termed herein the second commutation mode A.

Figure 7A:
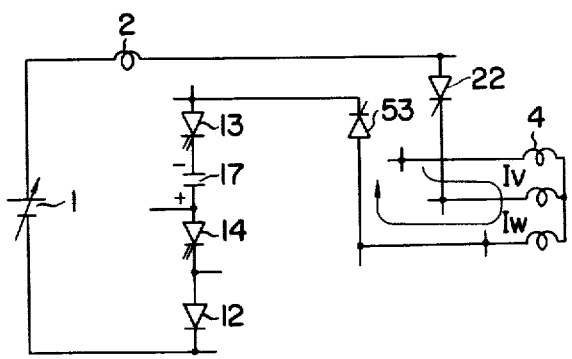
FIGS. 7a-7d are partial connection diagrams showing the operation of the inverter device shown in FIG. 5.
Figure 7B:
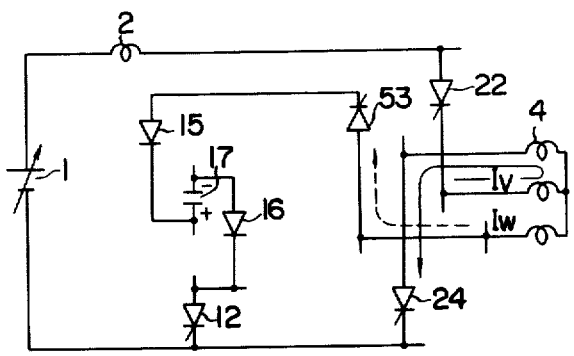

Then at the next commutation time $t_5$ the second auxiliary thyristor 12 is turned ON together with choppers 13, 14 and the first auxiliary thyristor 53, so that reverse voltage would be impressed across the main thyristor 26 to turn OFF the same. This state is shown in FIG. 7a in which current $I_w$ flows as shown by an arrow. Then at time $t_6$, after a time delay of $TD_1$ at which the main thyristor 26 turns OFF, choppers 13 and 14 are turned OFF while at the same time the main thyristor 24 is turned ON. Then the current $I_w$ flows against the condenser voltage $V_c$ so that the current $I_w$ decreases with time whereas current $I_u$ increases. This state is shown in FIG. 7b. During this interval, the condenser 17 is charged to increase its voltage $V_c$. As a consequence, at time $t_7$ current $I_w$ decreases to zero, and a reverse voltage is applied across the second and first auxiliary thyristors 12 and 53 to cause them to turn OFF, thus completing commutation.

Figure 4C:
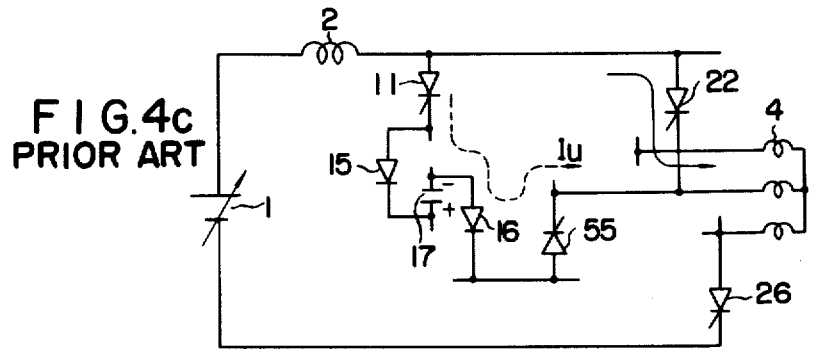
Figure 7C:
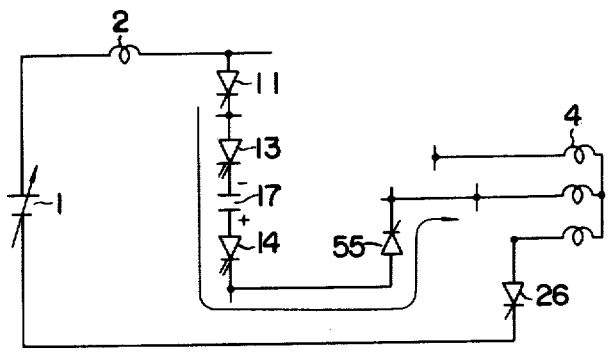
Figure 7D:
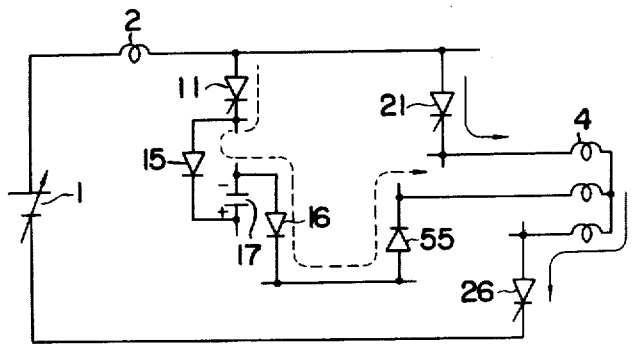

The commutation mode in which the condenser voltage $V_c$ increases is termed herein the first commutation mode B.

Where a pulse width modulation control is effected, there is a sequence in which the state shown in FIG. 4c exists where the main thyristors 22 and 26 which have been conducting return to the state shown in FIG. 4a. Describing such commutation also in terms of the first commutation mode B, as shown in FIG. 7c when auxiliary thyristor 11, choppers 13 and 14, and the first auxiliary thyristors 55 are turned ON, the condenser voltage $V_c$ would be applied across the main thyristor 22 in the reverse direction thus turning OFF the same. Then when the choppers 13 and 14 are turned OFF concurrently with the turning ON of the main thyristor 21, the current flowing as shown by a dotted line arrow decreases, whereas the current as shown by a solid line arrow increases as shown in FIG. 7d and the current path returns to the state shown in FIG. 4a upon completion of commutation.

The manner of stably controlling the inverter device by controlling the condenser voltage $V_c$ with the second commutation mode A in which the condenser 17 is discharged and with the first commutation mode B in which the condenser is charged will now be described with reference to waveforms shown in FIG. 8, in which curve A shows a signal having the inverter commutation frequency $f_0$, curve B the condenser voltage $V_c$, curve C the output of the comparator 71 and curve D the state of the mode transfer device.

As above described, comparator 71 compares the condenser voltage $V_c$ detected by voltage detector 76 with the reference value $R_{REF}$. During an interval between $t_0$ and $t_1$ in which $V_{REF} > V_c$ as shown in FIG. 8A, the mode transfer device 63 transfers the mode to the first commutation mode in which the condenser voltage $V_c$ is increased in synchronism with the inverter commutating frequency $f_0$ whereby the condenser voltage $V_c$ increases at each commutation. When it becomes $V_{REF} < V_c$ the mode is transferred to the second commutation mode A in which the condenser voltage decreases at time $t_1$ synchronous with the inverter commutation frequency $f_0$ whereby the condenser voltage $V_c$ decreases at each commutation. As above described, the commutation control is continued so as to maintain constant the condenser voltage $V_c$ by switching the mode between the first and second commutation modes B and A.

Detection of the completion of the commutation will be described with reference to the waveforms shown in FIG. 9 which is a magnified view of a portion of the second commutation mode A shown in FIG. 6. Curve A in FIG. 9 shows the U phase current $I_u$ of the motor 4, curve B the V phase current $I_v$, curve C the output of the current detector 18, curve D the output of the current detector 19, curve E the output of the current difference detector 66, curve F the output $I_o$ of the zero current detector 67, curve G the states of choppers 13 and 14 and curve H the state of the main thyristor 22.

Suppose now that at time $t_2$, choppers 13 and 14 are turned ON to initiate commutation. Assume now that the direct current supplied by the DC source and detected by the current detector 18 is constant as shown by curve A in FIG. 9, the load current $I_u$ which flows through the main thyristor 21 decreases, whereas the load current $I_v$ flowing through the second auxiliary thyristor 11, chopper 13, condenser 17, chopper 14 and the first auxiliary thyristor 55 increases and this current is detected by the current detector 19.

The current difference detector 66 detects the difference between the outputs of the current detectors 18 and 19, and its output is applied to the zero current detector 67 which in response to the zero output of the current difference detector 66 detects that the commutation has now completed, that is the direct current has been transferred to the condenser 17 from the inverter bridge 3 so as to produce this state as binary signal $I_o$. After elapse of a definite time $TD_2$ subsequent to the zero current detection, in other words, after elapse of time sufficient to turn OFF the main thyristor 21, as above described, choppers 13 and 14 are turned OFF while at the same time the main thyristor 22 is turned ON thus completing the second commutation mode A.

When effecting the operation as shown in FIG. 6 during the first commutation mode B, as shown in FIG. 5, a commutation mode signal can be produced by an output f which is produced from the frequency dividing circuit 60 at each commutation of 60° and by a signal $f_{TD1}$ which is produced by applying the output f to the time delay circuit for delaying it by an interval $TD_1$.

As can be noted from FIG. 6, during an interval between $t_5$ and $t_6$ the load current does not vary. More particularly, the delay time $TD_1$ is such that it would not initiate commutation of the load current. The same time delay $TD_1$ is also provided for the second commutation mode A so as to match the commutation delay times of the first and second commutation modes B and A as shown in FIG. 6.

Detection of zero current can also be made by connecting current detectors respectively on the DC side of the inverter bridge, i.e. at the common junction of the anode electrodes of the main thyristors 21, 22 and 23 and at the common junction of the cathode electrodes of the main thyristors 24, 25 and 26 and then forming a logical sum of the zero currents of respective current detectors.

Although the foregoing embodiments were described in terms of a three phase inverter it should be understood that the invention is also applicable to single phase, polyphase and multiplex inverter devices.

As above described according to this invention since the commutating mode is switched between a commutation mode in which a condenser is charged and another commutation mode in which the condenser is discharged so as to maintain constant the voltage of the condenser provided for storing commutation energy, the commutation voltage can be kept at a definite value which ensures stable commutation. Moreover, as the commutation energy is fed back to the load the efficiency of the inverter device can be improved. Further, only when the completion of the commutation is checked, the sequence is advanced so that it is not necessary to recover the condenser voltage at each commutation mode. This greatly decreases the period of the commutation sequence thereby enabling the inverter to operate at high frequencies. Furthermore, as it is possible to decrease the condenser voltage, the breakdown voltage of the main circuit elements can be reduced and moreover it is possible to decrease the surge voltage applied to the load. Further, according to this invention, the rate of current change is decreased which is effective to decrease the noise of the load.

According to the control method of this invention, as the phases of the load currents are matched at two types of the commutation modes no DC component is produced, thereby improving the efficiency. The commutation sequence is advanced by checking completion of commutation by detecting a zero current condition based on the difference between direct current and condenser current, or on the voltage difference at two points of the DC bus bar of the inverter bridge so that the inverter can be operated stably without any commutation failure.

According to another embodiment, the conduction times of the choppers and the second auxiliary thyristors are varied in accordance with the voltage of the condenser 17.

Figure 10:
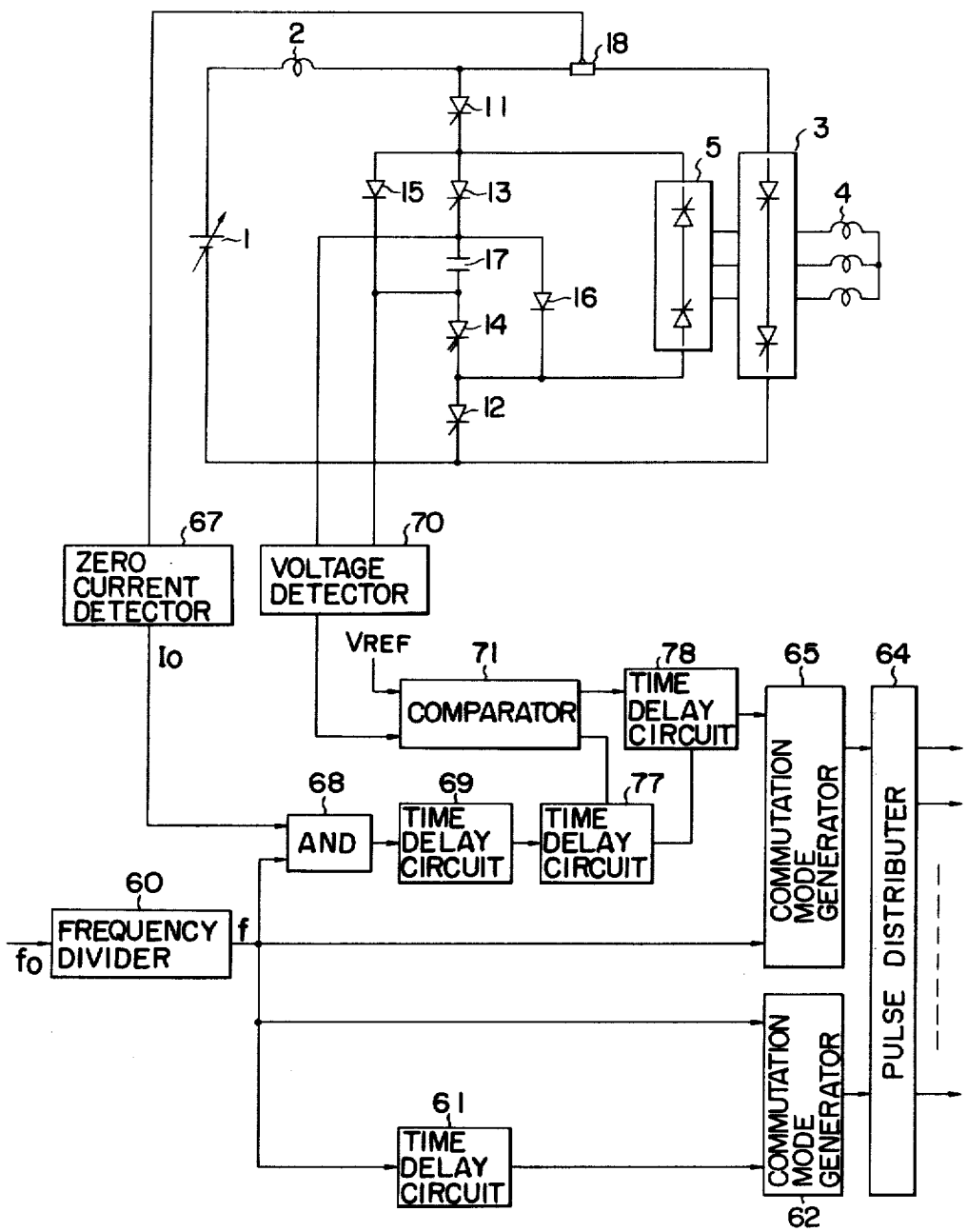
FIG. 10 is a block diagram showing another embodiment of this invention.

FIG. 10 shows such modification in which elements corresponding to those shown in FIG. 5 are designated by the same reference characters. In this embodiment, the connection between the frequency divider 60, time delay circuit 61 and the reference mode generator 62 is the same as that shown in FIG. 5, but the mode transfer device 63 and current difference detector 66 shown in FIG. 5 are omitted. In this case, zero current signal $I_o$ is produced by zero current detector 67 connected to DC shunt 18. The zero current signal $I_o$ and the output f of the frequency divider 60 are applied to the inputs of an AND gate circuit 68 and its output is passed through time delay circuit 69 having a time delay $TD_2$ and through a time delay circuit 77 having a time delay of $TD_\alpha$. The output of the comparator 71 is supplied to the time delay circuit 77 and another time delay circuit 78 having a time delay $TD_\beta$ such that when the condenser voltage is higher than the reference voltage $V_{REF}$ time delay circuit 77 would be operated, whereas in the opposite case the time delay circuit 78 would be operated. The outputs of this time delay circuit and the frequency divider 60 are applied to another commutation mode generator 65 and its output is applied to pulse distributor 64 together with the output of the commutation mode generator 62. The operation of this modification will be described with reference to FIG. 11. At time $t_0$ the main thyristors 21 and 26 are ON. At time $t_1$ the second thyristor 11, choppers 13 and 14 and the first auxiliary thyristors 55 are turned ON. At this time condenser 17 discharges to decrease its voltage $V_c$. At time $t_2$ the current of main thyristor 21 becomes zero and the commutation of the load current from $I_u$ (U phase current) to $I_o$ (V phase current) completes. At this time, since the load current flows through the second auxiliary thyristor 11 the current through the DC shunt 18 is zero. As a consequence, the zero current detector 67 detects the completion of the commutation of the main thyristor 21 and at time $t_3$ when the commutation has completed choppers 13 and 14 are turned OFF. Then the main thyristor 22 is turned ON so that the condenser voltage is impressed across the second and first auxiliary thyristors 11 and 55 in the reverse direction to quickly turn OFF them. The state in which the condenser voltage decreases is termed a commutation mode A.

At time $t_5$, the second auxiliary thyristor 12 is turned ON together with choppers 13 and 14 and the first auxiliary thyristor 53 to apply reverse voltage across the main thyristor 26 to turn OFF the same. At time $t_6$ after an interval sufficient to turn OFF the main thyristor 26, choppers 13 and 14 are turned OFF and the main thyristor 24 is turned ON. Then the current $I_w$ flows against condenser voltage $V_c$, while current $I_u$ increases. Meanwhile condenser 17 is charged to increase its voltage $V_c$. At time $t_7$, current $I_w$ reduces to zero and the second and first auxiliary thyristors 12 and 53 are turned OFF by being applied with reverse voltage. This mode in which the condenser voltage increases is termed a commutation mode B.

As above described, the positive side main thyristors are commutated at the commutation mode A in which the condenser is discharged as shown in FIG. 10, whereas the negative side main thyristors are commutated at the commutation mode B in which the condenser 17 is charged so that the charging and discharging currents may be made substantially equal. It should be understood that the positive side thyristors may be commutated at the mode B and the negative side main thyristors at the mode A.

The manner of commutation will be described in more detail with reference to FIG. 12.

FIG. 12a is a state which shows, by the output $I_o$ of the zero current detector 67, the fact that the current through the main thyristor 21 has decreased to zero and that the direct current has been commutated to the first auxiliary thyristor 55 through the first auxiliary thyristor 11. At this time, the output frequency f of the frequency divider 60 is applied to time delay circuits 69 and 77 through AND gate circuit 68 to be delayed by $(TD_{12} + TD_\alpha)$. During the interval between $t_1$ to $t_3$, the condenser 17 discharges so that its voltage $V_c$ decreases. Then at time $t_4$ determined by the delay time $TD_\beta$ provided by the time delay circuit 78, a circuit as shown in FIG. 4b is established to complete the commutation. During the interval between $t_3$ and $t_4$, the condenser 17 is charged so that its voltage $V_c$ increases. As above described, during the commutation mode B the condenser voltage $V_c$ decreases between $t_5$ and $t_6$, but increases between $t_6$ and $t_7$ as above described. As shown in FIG. 12b when the commutation modes A and B are executed over one cycle the charging and discharging currents become unbalanced so that the condenser voltage $V_c$ varies. To assure safe commutation of the inverter device it is necessary to maintain the condenser voltage at a substantially constant value. For this reason as shown in FIG. 10 the condenser voltage $V_c$ is compared with the reference voltage $V_{REF}$, by the comparator 71. By the out of this comparator time delay circuit 77 is made operative whereas the time delay circuit 78 is made inoperative to increase the condenser voltage $V_c$ as shown in FIG. 12c. On the other hand, when the condenser voltage is higher than the reference voltage the time delay circuit 78 is made operative whereas the time delay circuit 77 inoperative thus decreasing the condenser voltage $V_c$ as shown in FIG. 12d. By this control, the charging and discharging currents are made to balance with each other at all times. Instead of selectively use the time delay circuits 77 and 78, these circuits may be controlled to be variable. In an ordinary inverter, since the condenser voltage decreases to zero it is possible to make zero the delay time $TD_{60}$ and to control the condenser voltage by merely turning ON and OFF the time delay circuit 78.

Although in the foregoing description the commutation modes A and B were allocated for the upper side and the lower side of the main thyristor bridge, the invention is not limited thereto but where a pulse width modulation, for example, is to be made, the commutation modes may be performed alternately.

A portion of the condenser charging current may be supplemented from an auxiliary DC source through a current limiting resistor, not shown.

As a method of charging the capacitor 17 and starting the inverter device, as shown in FIG. 13, the output voltage $V_b$ of the DC source 1 is raised after time $t_1$ while at the same time the second auxiliary thyristors 11 and 12 are turned ON and the choppers 13 and 14 are turned OFF to turn OFF the main thyristor bridge 3. Then the condenser 17 is charged by direct current $I_d$ until it is fully charged at time $t_2$. During an interval between $t_2$ and $t_3$ current flows in an amount sufficient to supplement the condenser discharge current. Upon application of an inverter start command at time $t_3$, the voltage of the DC source is decreased temporarily to decrease the direct current to zero at time $t_4$. Then the normal operation of the inverter is commenced. In this manner, the charging mode of the condenser can be smoothly transferred to the inverter operation mode, thus enabling stable starting of the inverter.

During the normal operation of the inverter as the condenser charging mode and the discharging mode are executed alternately so that the charging and discharging currents substantially balance with each other and only the excessive or deficient amount is supplemented by controlling the timing of commutation of from an auxiliary DC source not shown whereby it is possible to decrease the commutation time and hence to increase the operating frequency of the inverter device. This not only decreases the condenser voltage but also the withstand voltage of the main circuit elements.

I claim:

1. A method of controlling an inverter device comprising an inverter bridge connected across a direct current source, an auxiliary thyristor bridge connected to AC output terminals of said inverter bridge, a condenser connected across cathode and anode electrodes of said auxiliary thyristor bridge which acts as a first switching circuit for charging and discharging said condenser, and a second switching circuit for connecting cathode and anode electrodes of said auxiliary thyristor bridge across said DC source, said method comprising the steps of comparing voltage of said condenser with a reference voltage, controlling said respective switching circuits so as to effect commutations of said inverter bridge in a direction to charge said condenser when said condenser voltage is lower than said reference voltage, setting a predetermined delay time corresponding to a commutation initial delay for said inverter bridge at the time of charging said condenser so that said commutation will be delayed during discharge of said condenser, controlling said respective switching circuit, so as to effect commutation of said inverter bridge in a direction to discharge said condenser when said condenser voltage is higher than said reference voltage thereby controlling said condenser voltage in accordance with said reference voltage.

2. A method of controlling an inverter device comprising an inverter bridge connected across a direct current source, an auxiliary thyristor bridge connected to AC output terminals of said inverter bridge, a condenser connected across cathode and anode electrodes of said auxiliary thyristor bridge which acts as a first switching circuit for charging and discharging said condenser, and a second switching circuit for connecting cathode and anode electrodes of said auxiliary thyristor bridge across said DC source, said method comprising the steps of comparing voltage of said condenser with a reference voltage, controlling said respective switching circuits so as to effect commutations of said inverter bridge in a direction to charge said condenser when said condenser voltage is lower than said reference voltage, controlling said respective switching circuit, so as to effect commutation of said inverter bridge in a direction to discharge said condenser when said condenser voltage is higher than said reference voltage thereby controlling said condenser voltage in accordance with said reference voltage and, delaying subsequent commutation for a predetermined time after a previous commutation is completed, the completion of said previous commutation being determined by comparing direct current supplied by said DC source and current of said condenser.

3. Control apparatus of an inverter device comprising an inverter bridge connected across a direct current source, an auxiliary thyristor bridge connected to AC output terminals of said inverter bridge, a condenser connected through choppers across cathode and anode electrodes of said auxiliary thyristor bridge which acts as a first switching circuit for charging and discharging said condenser, and a second switching circuit for connecting cathode and anode electrodes of said auxiliary thyristor bridge across said DC source, said control apparatus comprising:

means responsive to difference between direct currents flowing through said inverter device and through said condenser for producing a commutation completion signal;

a comparator for comparing voltage of said condenser with a predetermined reference value;

a frequency divider for dividing commutating frequency into an output frequency of said inverter device;

first time delay means for delaying the output of said frequency divider by a predetermined time;

second time delay means connected to respond to said commutation completion signal and the output of said first time delay means via an AND gate circuit;

a first commutation mode generator connected to receive the outputs of said first and second time delay means for producing a second mode in which the commutation of said inverter device is to be made such that said condenser is charged when said condenser voltage is higher than said reference voltage;

a second commutation mode generator connected to receive the outputs of said frequency divider and said first time delay means for producing a first mode in which the commutation of said inverter device is to be made such that said condenser discharges when said condenser voltage is higher than said reference voltage;

a pulse distributor for distributing ignition pulses to said inverter bridge, said auxiliary thyristor bridge, said second switching circuit and said choppers, and mode transfer means responsive to the output of said comparator and an inverter commutation frequency for connecting either one of the outputs of said first and second mode generators to said pulse distributor.

4. Control apparatus of an inverter comprising an inverter bridge connected across a direct current source, an auxiliary thyristor bridge connected to AC output terminals of said inverter bridge, a condenser connected through choppers across cathode and anode electrodes of said auxiliary thyristor bridge which acts as a first switching circuit for charging and discharging said condenser, and a second switching circuit for connecting cathode and anode electrodes of said thyristor bridge across said DC source, said control apparatus comprising means responsive to DC current flowing through said inverter device for producing a commutation completion signal; a comparator for comparing a voltage of said condenser with a predetermined reference value; a frequency divider for dividing commutating frequency into an output frequency of said inverter device; first time delay means for delaying the output of said frequency by a first predetermined time; serially connected second and third time delay means for providing predetermined second and third time delays respectively; an AND gate circuit with its inputs connected to receive the output of said frequency divider and said commutation completion signal and its output connected to said second time delay means; a fourth time delay means for delaying the output of said third time delay means; means for selectively operating said third and fourth time delay means by the output of said comparator; a first commutation mode generator connected to receive the outputs of said fourth time delay means and said frequency divider for producing a second mode in which the commutation of said inverter device is to be made such that said condenser is charged when said condenser voltage is higher than said reference voltage; a second commutation mode generator connected to receive the outputs of said frequency divider and said first time delay means for producing a first mode in which the commutation of said inverter device is to be made such that said condenser discharges when said condenser voltage is higher than said reference voltage; and a pulse distributor connected to the outputs of said first and second mode generators for distributing ignition pulses to said inverter bridge, said auxiliary thyristor bridge and said choppers.

* * * * *